United States Patent [19]

Das et al.

[11] Patent Number: 5,386,724
[45] Date of Patent: Feb. 7, 1995

[54] LOAD CELLS FOR SENSING WEIGHT AND TORQUE ON A DRILL BIT WHILE DRILLING A WELL BORE

[75] Inventors: Pralay K. Das; Haoshi Song, both of Sugar Land, Tex.

[73] Assignee: Schlumberger Technology Corporation, Houston, Tex.

[21] Appl. No.: 115,285

[22] Filed: Aug. 31, 1993

[51] Int. Cl.[6] .......................................... E21B 47/00
[52] U.S. Cl. ........................... 73/151; 175/40; 73/767
[58] Field of Search ............... 73/151, 862.49, 862.541, 73/862.68, 767; 175/40; 166/250

[56] References Cited

U.S. PATENT DOCUMENTS

| | | | |
|---|---|---|---|
| 3,827,294 | 8/1974 | Anderson | 73/151 |
| 3,876,972 | 4/1975 | Garrett | 367/83 |
| 3,968,473 | 7/1976 | Patton et al. | 367/82 |
| 4,120,198 | 10/1978 | Tanguy et al. | 73/151 |
| 4,138,882 | 2/1979 | Lockeny et al. | 73/767 |
| 4,359,898 | 11/1982 | Tanguy et al. | 73/151 |
| 4,445,578 | 5/1984 | Millheim | 73/151 |
| 4,608,861 | 9/1986 | Wachtler et al. | 73/151 |
| 4,739,841 | 4/1988 | Das | 175/61 |
| 4,811,597 | 3/1989 | Hebel | 73/151 |
| 4,821,563 | 4/1989 | Maron | 73/151 |
| 4,958,517 | 9/1990 | Maron | 73/151 |
| 5,202,681 | 4/1993 | Dublin, Jr. et al. | 73/151 |

*Primary Examiner*—Robert J. Warden
*Assistant Examiner*—Hien Tran

*Attorney, Agent, or Firm*—David P. Gordon; Wayne I. Kanak

[57] ABSTRACT

A load cell for sensing weight and torque on a drill bit during a drilling operation includes a cylindrical load cell made from a material with minimum residual stress. A plurality of strain gages are arranged symmetrically on each load cell and electrically coupled to form two Wheatstone bridges. The load cells are mounted 180 degrees apart in radial pockets drilled in a drill collar wall. A half Wheatstone bridge from one load cell is electrically coupled with a half Wheatstone bridge from the other load cell to form a Wheatstone bridge for measuring WOB and a similar coupling is made to form another Wheatstone bridge for measuring TOB. In another embodiment, additional strain gages in another Wheatstone bridge measure differential pressure. The output of the pressure and weight bridges are electrically combined to provide a weight signal unaffected by differential pressure fluctuations. The load cells are force fit in the radial pockets in the drill collar and a cap is installed on each pocket housing a load cell to protect the load cell from drilling fluid. The strain gages in each load cell are placed to minimize the effects of bending, hydrostatic pressure, temperature, differential pressure and cross talk between WOB and TOB measurements. The load cells can be replaced easily and drill collar gauging is not required. Since the strain gages are not directly attached to the drill collar, the high residual stress in the drill collar does not cause the strain gages to drift.

36 Claims, 5 Drawing Sheets

FIG. 12 ly sizing the
LOAD CELLS FOR SENSING WEIGHT AND TORQUE ON A DRILL BIT WHILE DRILLING A WELL BORE

BACKGROUND OF THE INVENTION

1. Field of the Invention

The present invention relates to the making of downhole force measurements during the drilling of a well bore. More particularly, this invention relates to an apparatus for sensing the amount of weight and/or torque being applied to the drill bit during the drilling operation.

2. State of the Art

It is well known that the axial load and torque applied to a drill bit during the drilling of a well are important parameters which affect the direction and inclination of the borehole as well as the economics of the drilling operation.

The axial load on the drill bit is also known as the "weight-on-bit" or "WOB". Weight is applied to the drill bit by a string of heavy drill collars that are attached immediately above the drill bit and suspended in the borehole on a smaller diameter drill pipe. In conventional drilling practice, the entire length of the drill pipe and the upper portion of the drill collar are suspended at the surface by a derrick in tension so that the amount of WOB can be adjusted by changing the surface hook load. WOB affects the rate of penetration, the drill bit wear and the direction of drilling. The torque applied to the drill bit ("torque-on-bit" or "TOB") is also important with regard to drill bit wear and drilling direction, particularly when considered together with measurements of WOB. Excessive TOB is indicative of serious bit damage such as bearing failure and locked cones.

In the past, measurements of WOB and TOB were made at the surface by comparing the "hook load weight" to the "off-bottom weight" of the drill string and by measurement of the torque applied to the drill string at the surface. It was soon discovered that surface measurements of WOB and TOB are simply not reliable since other forces acting on the drill string interfere with surface measurement.

More recently, various systems have been devised for taking measurements "down-hole" and transmitting these measurements to the surface during the drilling of the borehole. Nevertheless, the down-hole sensors that have been utilized are also subject to significant inaccuracies due to the effects of well pressure and temperature gradients. These systems cannot distinguish between strain due to weight and axial strain due to pressure differential, the force on the end area of the drill string which urges the drill string to elongate under internal pressure. They are also adversely affected by the pressure exerted by drilling fluids.

Several attempts have been made to improve the accuracy of down-hole measurements. One approach, as taught by U.S. Pat. No. 3,686,942 to Chatard et al., is to mechanically constrain a sensitive transducer so that it cannot be deformed and damaged at high loads. Nevertheless, since the transducer-bearing member must be capable of supporting significant axial and/or torsional loads, the transducer is relatively insensitive to minor load changes which are still important to measure. Another approach, as taught by U.S. Pat. No. 3,968,473 to Patton et al., is to provide an inner mandrel with a thin section on which strain gages are mounted and an outer stabilizing sleeve. The compromise between strength and sensitivity is achieved by mathematically sizing the elements. The results from this approach are less than satisfactory. Still another approach, as taught by U.S. Pat. Nos. 3,827,294 to Anderson, 3,876,972 to Garrett, 4,608,861 to Wachtler et al., and 4,811,597 to Hebel, is to provide a mechanical strain amplifier. In these patents, sensors are carefully arranged on stress members which coact with other stress members to produce a sensor response at relatively minor load changes while using a sensor capable of resisting heavy loads. The sensor arrangement is sometimes mechanically isolated by various sleeves and tubes in attempts to eliminate interference from internal bore pressure, temperature and fluids. However, the mechanical amplifier approach is complex and does not adequately isolate the sensors from the effects of thermal expansion.

Both U.S. Pat. Nos. 4,359,898 to Tanguy et al. and 4,821,563 to Maron teach an arrangement of strain gages in a pair of diametrically opposed radial holes in the wall of a drill collar sub carried in the drill string above the bit. Ovalization of the radial holes due to axial or torsional forces on the drill collar or housing is measured by the strain gages on the inner surface of the radial holes. The strain gages are located in positions to minimize interference from temperature gradients and drilling fluid. Tanguy et al. requires a pressurized axial sleeve extending above and below the radial holes and a sealed tube extending across the bore of the drill string which supports end plugs and, in conjunction with the end plugs, establishes an atmospheric chamber in which the strain gages are located in order to eliminate spurious stresses in the region of the holes caused by pressure differences inside and outside the housing. Maron, on the other hand, dispenses with these complicated sleeves and chambers by asymmetrical positioning of the strain gages to minimize errors in the weight measurement caused by pressure changes in the drilling fluid. Maron places six strain gages 45 degrees apart from each other on the inner surface of one radial hole leaving a one hundred thirty-five degree gap between the first and sixth strain gage. In the other hole, Maron places four strain gages 45 degrees apart from each other and a fifth and sixth strain gage respectively 90 degrees apart from the first and fourth strain gage. The strain gages are wired together in three bridge circuits (four strain gages for each), one for measuring TOB, one for measuring WOB, and one for measuring bend on bit.

Both Maron and Tanguy et al. achieve significant improvements in the accuracy of down-hole measurements. However, the arrangement of strain gages on the inner surface of the radial holes is difficult to assemble and maintain. Moreover, the strain gages are subject to measurement drift because of the residual stress in the cold worked drill collar material on which they are mounted.

SUMMARY OF THE INVENTION

It is therefore an object of the invention to provide an arrangement of strain gages in a drill collar which are sensitive to weight on bit and torque on bit while being insensitive to other forces.

It is also an object of the invention to provide an arrangement of strain gages in a drill collar which provide independent sensitivity to torque and weight without one force interfering with the measurement of the other.

It is another object of the invention to provide a means for arranging strain gages in a drill collar which is not subject to the high residual stress associated with the radial holes in the drill collar.

It is still another object of the invention to provide an arrangement of strain gages for use in a drill collar which is easy to manufacture, install, and maintain.

It is yet another object of the invention to provide an arrangement of strain gages for measuring differential pressure so that weight on bit measurement can be adjusted to compensate for changes in differential pressure.

In accord with these objects which will be discussed in detail below, the present invention provides a pair of load cells, each of which includes a housing made from a material with minimum residual stress. A plurality of strain gages are arranged symmetrically in each load cell housing and are electrically coupled to form two Wheatstone bridges. The load cells are mounted one hundred eighty degrees apart in radial pockets in a drill collar wall. A half Wheatstone bridge formed by strain gages of one load cell is electrically coupled with a half Wheatstone bridge formed from strain gages of the other load cell to form a Wheatstone bridge for measuring TOB. A similar coupling of strain gages from the different load cells is made to form another Wheatstone bridge for measuring WOB. The load cells are retained in the radial pockets in the drill collar by an interference or press fit or with any other mechanical fastener such as screws or bolts. A cap is installed on each pocket housing a load cell to protect the load cell from drilling fluid. The strain gages in each load cell are particularly located in order to minimize the effects of bending, hydrostatic pressure, temperature, differential pressure and cross talk between WOB and TOB measurements.

In the preferred embodiment of the invention, each cylindrical load cell includes eight strain gages (four for torque and four for weight) which are alternately arranged at 45 degree intervals on the cell. The weight strain gages are mounted at 0, 90, 180 and 270 degrees relative to the axis of the drill collar, while the torque strain gages are mounted at 45, 135, 225 and 315 degrees relative to the axis of the drill collar. The strain gages for weight and torque may, however, be mounted at other angular positions relative to the drill collar. High temperature coating is used to cover and protect the gages and wiring. Two identical load cells are mounted 180 degrees apart in radial pockets drilled in a drill collar. A zero degree reference line is provided on each load cell for alignment with the axis of the drill collar. Electrical conductors from each load cell are carried in small wiring holes to a mandrel at the center of the drill collar and typically up-hole to measurement while drilling (MWD) electronics in the drill string. Each arm of two Wheatstone bridges consists of two diametrically opposed strain gages. Thus, the four weight strain gages from one load cell and the four weight strain gages from the other load cell are electrically coupled to form a Wheatstone bridge for measuring WOB; each arm of the Wheatstone bridge consisting of two diametrically opposed strain gages and adjacent arms consisting of strain gages from the same load cell. The same electrical coupling is made with the torque strain gages resulting in a similar Wheatstone bridge for measuring TOB. The physical arrangement and electrical connection of the strain gages eliminate or minimize the adverse effects of other down-hole conditions on the measurement of WOB and TOB. In addition, the load cells are easily replaced, and drill collar gauging (i.e., placement of the strain gages directly on the drill collar) is not required. Since the strain gages are not directly attached to the drill collar, the high residual stress in the drill collar only affects the load cell, thereby affecting the individual gages evenly and preventing drift in the bridge output.

According to an alternate embodiment of the invention, four pressure measuring strain gages are mounted adjacent to the weight measuring strain gages on each load cell and coupled to form a Wheatstone bridge for measuring differential pressure. The differential pressure measurements are scaled and added to scaled weight on bit measurements to provide a corrected weight on bit measurement which compensates for differential pressure.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
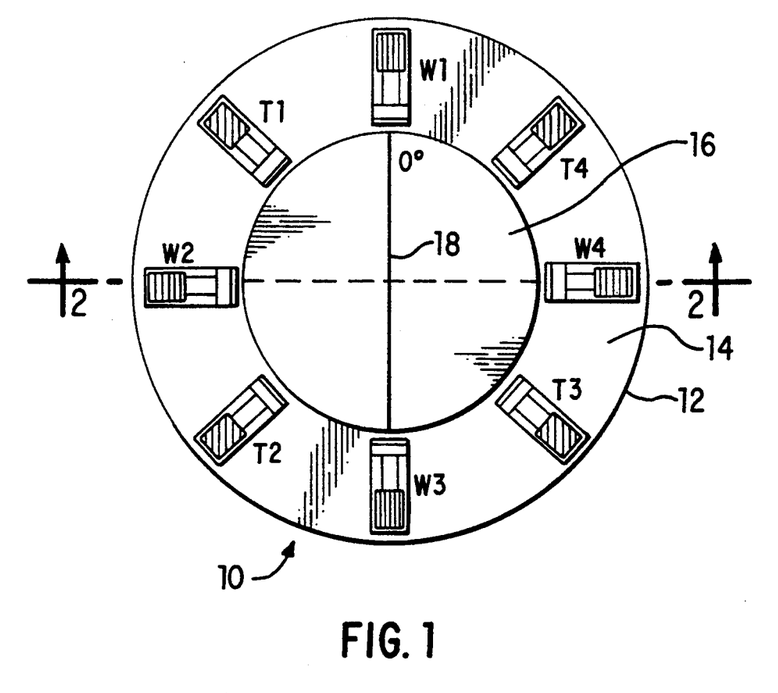
FIG. 1 is a front elevation view of a load cell with strain gages according to the invention.
Figure 2:
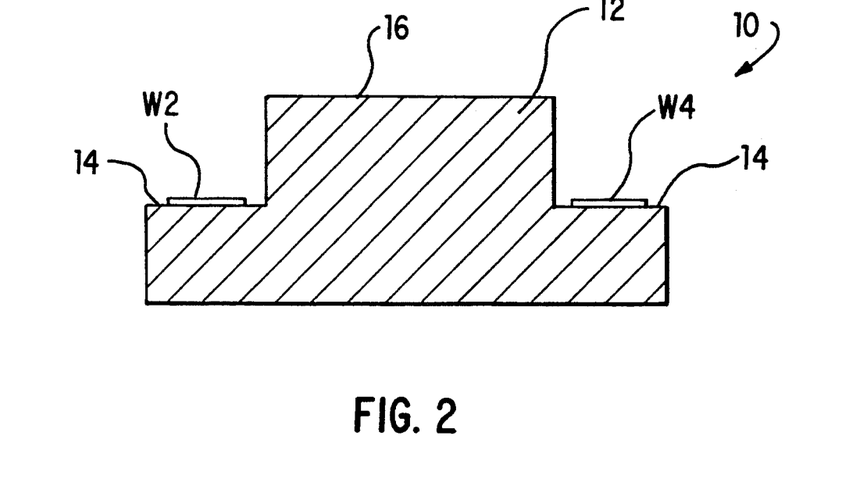
FIG. 2 is a cross sectional view along line 2—2 of FIG. 1.

Turning now to FIGS. 1 and 2, according to the invention, a first load cell 10 is constructed from a stepped cylinder 12 having an annular surface 14 and a raised central hub 16. Cylinder 12 is made from a high strength homogeneous material having a minimum residual stress such as a beryllium copper, INCONEL X-750 or INCONEL 718 (nickel chromium alloys), or a 17-4 stainless steel. Eight strain gages, T1-T4 and W1-

W4, are arranged symmetrically on the annular surface 14 of the cylinder 12. After the strain gages are electrically coupled as described below, the strain gages T1-T4, W1-W4 are bonded to the surface of the cylinder 12 and covered and protected by a high temperature coating (not shown) by processes which are well known in the art. A zero degree reference line 18 is preferably etched or engraved on the hub 16 of the load cell 10 so that the load cell 10 may be aligned with the vertical axis of a drill collar as described below. It will be appreciated that the hub 16, while not absolutely required, provides advantages in that it aids in the handling of the load cell 10 during insertion and alignment of the load cell 10 in the drill collar. It also acts as a spacer between the strain gages and the sealing caps 11, 21, described below with reference to FIG. 4.

As shown in FIG. 1, four strain gages for measuring WOB, W1-W4 are placed at 0°, 90°, 180°, and 270° relative to the zero degree reference 18. For purposes of convenience, the strain gages W1-W4 are referenced in a counter-clockwise configuration. Those skilled in the art will appreciate that "ovalization" of the cylinder 12 due to forces acting parallel to the zero degree reference line 18 (as discussed hereinafter with reference to FIG. 10) will result is strains measurable by the strain gages W1-W4.

Four strain gages for measuring TOB, T1-T4 are placed at 45°, 135°, 225°, and 315° relative to the zero degree reference line 18. For purposes of determining direction of torque, the strain gages T1-T4 are preferably referenced in a counter-clockwise configuration. Those skilled in the art will appreciate that "ovalization" of the cylinder 12 due to forces acting in directions oblique to the zero degree reference line 18 (as discussed hereinafter with reference to FIG. 11) will result in strains measurable by the strain gages T1-T4.

Figure 3:
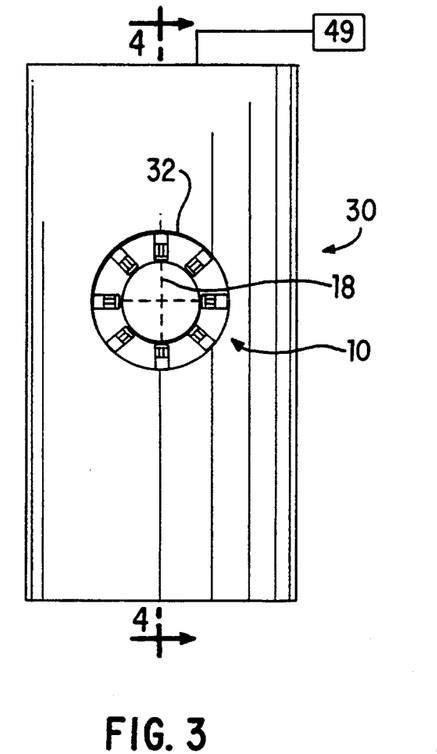
FIG. 3 is a view similar to FIG. 1, but showing the load cell mounted in a radial pocket in a drill collar with the cap removed.
Figure 4:
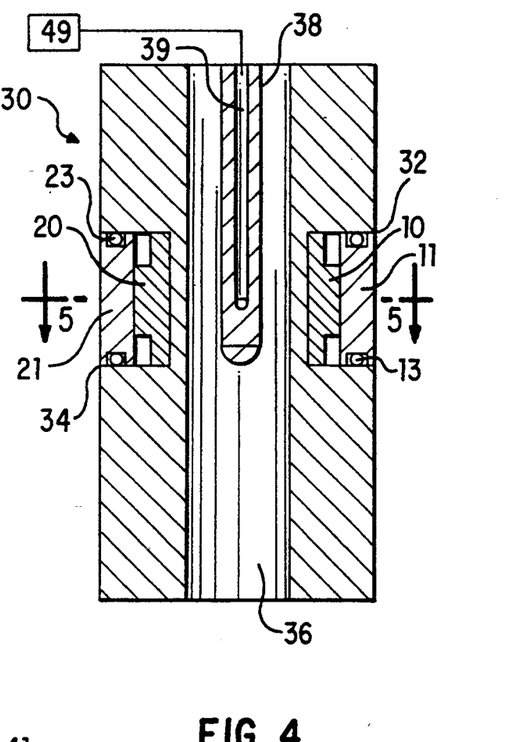
FIG. 4 is a cross sectional view along line 4—4 of FIG. 3 showing the relative location of two load cells and their respective caps.
Figure 5:
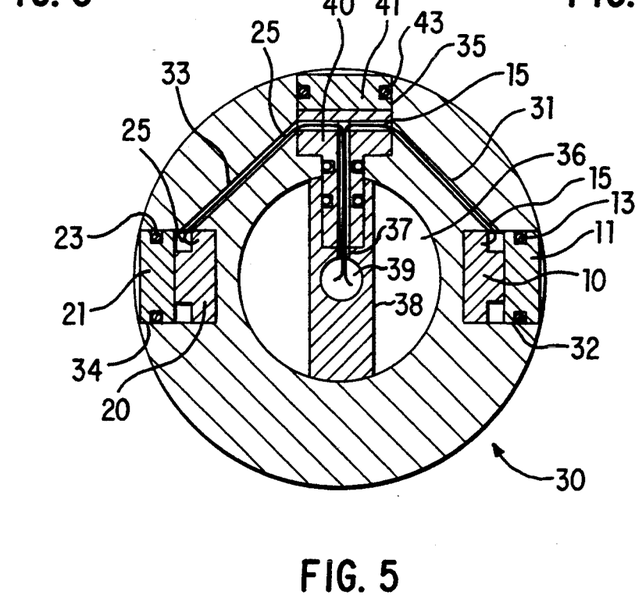
FIG. 5 is a cross sectional view along line 5—5 of FIG. 4 showing the relative locations of load cells, caps, and a wiring harness.

FIGS. 3-5 show the placement of the load cell 10 in a radial pocket 32 in a drill collar 30. As mentioned above, a second load cell 20, identical to the first load cell 10, is mounted in a second radial pocket 34 in the drill collar 30. The second radial pocket 34 is located 180° around the drill collar 30 from pocket 32. The drill collar 30 is also provided with a central axial bore 36 carrying a mandrel 38 having its own central bore 39 and radial hole 37. A third radial pocket 35 in drill collar 30 communicates with the radial hole 37 in the mandrel 38. Radial pocket 35 also communicates with radial pockets 32, 34 through small diagonal wire holes 31, 33 as seen best in FIG. 5.

The load cells 10, 20 are inserted into the pockets 32, 34 and aligned so that the zero degree reference line 18 is substantially parallel to the vertical axis of the drill collar 30. Wires 15, 25 from the strain gages are fed through holes 31, 33 to a wiring harness 40 mounted in pocket 35. The wiring harness 40 carries the wires 15, 25 from the strain gages on the load cells to the central bore 39 in the mandrel 38 where they are fed to the MWD electronics 49. Pockets 32, 34, and 35 are then sealed with caps 11, 21, 41, each of which is provided with a sealing O-ring 13, 23, 43.

Figure 6:
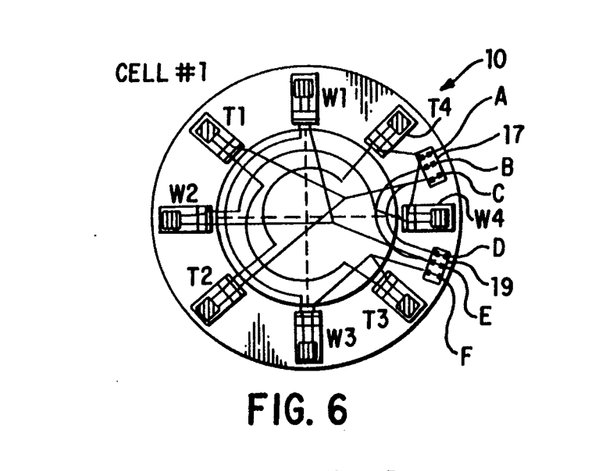
FIG. 6 is a schematic view of the wiring of strain gages in the first load cell.
Figure 7:
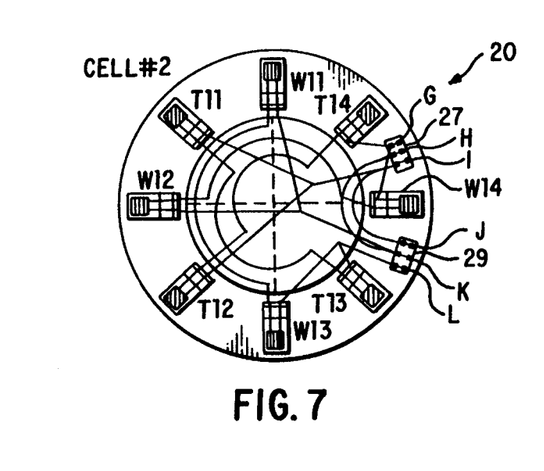
FIG. 7 is a schematic view of the wiring of strain gages in the second load cell.
Figure 8:
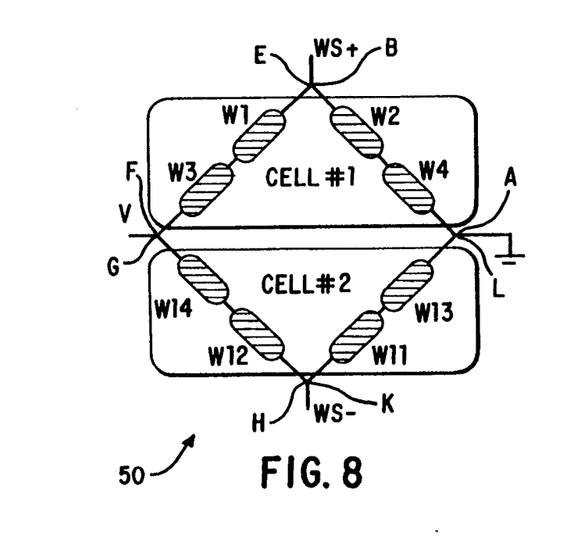
FIG. 8 is a schematic diagram of the coupling of strain gages from the two load cells to form a Wheatstone bridge for measuring WOB.
Figure 9:
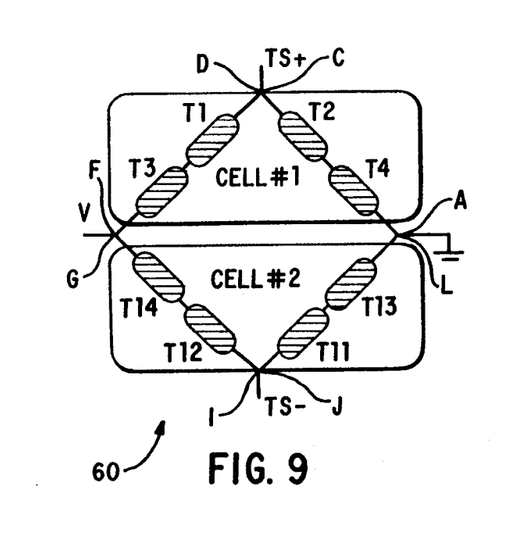
FIG. 9 is a schematic diagram of the coupling of strain gages from the two load cells to form a Wheatstone bridge for measuring TOB.

FIGS. 6-9 show the electrical coupling of the two load cells 10, 20. As mentioned above, load cell 10 includes TOB strain gages T1-T4 and WOB strain gages W1-W4. FIG. 7 shows an identical second load cell 20 with the same arrangement of strain gages referenced as T11-T14 and W11-W14. Diametrically opposed strain gages (T1 & T3, T2 & T4, W1 & W3, W2 & W4) in load cell 10 are electrically coupled in series and preferably coupled to terminal strips 17, 19 which are optionally provided for ease of connection. The optional terminal strips act as a connection mechanism for the coupling of the strain gages of load cell 10 with the strain gages from load cell 20, with a source of excitation voltage, and with the MWD electronics for measuring WOB and TOB. Diametrically opposed strain gages (T11 & T13, T12 & T14, W11 & W13, W12 & W14) in load cell 20 are similarly electrically coupled in series and are coupled to terminal strips 27, 29 which are optionally provided for eventual coupling to the strain gages from load cell 10, with a source of excitation voltage, and with the MWD electronics for measuring WOB and TOB. Specifically, with respect to load cell 10, and as seen in FIGS. 6, 8, and 9, strain gage W1 is coupled to terminal E and to strain gage W3 which in turn is coupled to terminal F. Strain gage W2 is coupled to terminal B and to strain gage W4 which in turn is coupled to terminal A. Strain gage T1 is coupled to terminal D and to strain gage T3 which in turn is coupled to terminal F. Strain gage T2 is coupled to terminal C and to strain gage T4 which in turn is coupled to terminal A. With respect to load cell 20, and as seen in FIGS. 7, 8, and 9, strain gage W11 is coupled to terminal K and to strain gage W13 which in turn is coupled to terminal L. Strain gage W12 is coupled to terminal H and to strain gage W14 which in turn is coupled to terminal G. Strain gage T11 is coupled to terminal J and to strain gage T13 which in turn is coupled to terminal L. Strain gage T12 is coupled to terminal I and to strain gage T14 which in turn is coupled to terminal G. As seen in FIGS. 6 and 7, each load cell is provided with six terminals although some terminals duplicate others, and hence only four are actually required. The six terminals are provided, however, both for symmetry so that one load cell design can be used in both locations on the drill collar, and so that the same load cell design can be used with an alternative embodiment discussed below with reference to FIGS. 12 and 13.

The electrical coupling of strain gages from load cells 10 and 20 is shown in greater detail in FIGS. 8 and 9. As mentioned above, the load cells are coupled to form two Wheatstone bridges. As seen in FIG. 8, strain gages W1, W3 and W2, W4 from load cell 10 form two arms of a Wheatstone bridge 50 for measuring WOB. Strain gages W11, W13 and W12, W14 from load cell 20 form the other two arms of Wheatstone bridge 50. As seen in FIG. 9, strain gages T1, T3 and T2, T4 from load cell 10 form two arms of a Wheatstone bridge 60 for measuring TOB. Strain gages T11, T13 and T12, T14 from load cell 20 form the other two arms of Wheatstone bridge 60. The connections of the respective strain gages are preferably made through the terminal strips 17, 19, 27, 29 on the two load cells. Terminals A and L are coupled to each other and to ground. Terminals F and G are coupled to each other and to a source of excitation voltage V. Terminals E and B are coupled to each other and form the positive output WS+ of bridge 50. Terminals H and K are coupled to each other and form the negative output WS− of bridge 50. Terminals D and C are coupled to each other and form the positive output TS+ of bridge 60. Terminals I and J are coupled to each other and form the negative output TS− of bridge 60.

The difference of the outputs WS+, TS− from bridge 50 is proportional to the weight-on-bit (WOB) according to a formula set forth below. Likewise, the difference of the outputs TS+, TS− from bridge 60 is proportional to the torque-on-bit (TOB) as set forth below. When the drill string is subjected to weight or torque, the load cells will deform with the drill collar and the strain gages attached to the load cells will change their electrical resistance. For example, in response to WOB, the load cells will deform as shown (in an exaggerated manner) in FIG. 10 with strain gages W1, W11, W3, and W13 being compressed and strain gages W2, W12, W4, and W14 being stretched. Similarly, in response to counter-clockwise TOB, the load cells deform as shown (in an exaggerated manner) in FIG. 11. Strain gages T1, T11, T3, and T13 are compressed and strain gages T2, T12, T4, and T14 are stretched.

Those skilled in the art will appreciate that the change in the resistance of each strain gage is proportional to the strain according to:

$$\frac{\Delta R}{R} = F_g \epsilon \tag{1}$$

where $F_g$ is the gage factor, $\epsilon$ is the actual strain in inches/inch, $\Delta R$ is the change in electrical resistance, and R is the static resistance of the gage when not strained. Typically, a constant excitation voltage V is applied to each bridge as shown in FIGS. 8 and 9. When the gages are perfectly balanced, the output voltage from the bridges at WS and TS will be zero. Any change in the resistances of the gages, however, will cause a change in voltage at the outputs according to $$\frac{\Delta V_s}{V} = \frac{1}{4} \left( \frac{\Delta R_1 + \Delta R_3}{R_1 + R_3} + \frac{\Delta R_{11} + \Delta R_{13}}{R_{11} + R_{13}} - \frac{\Delta R_2 + \Delta R_4}{R_2 + R_4} - \frac{\Delta R_{12} + \Delta R_{14}}{R_{12} + R_{14}} \right) \tag{2}$$

where $V_s$ is the change in output voltage, V is the excitation voltage, R is the change in electrical resistance, R is the static resistance of the gage when not strained, and the subscript numbers refer to the gage numbers (W1-W4 and W11-W14 or T1-T4 and T11-T14 depending on which bridge output is being measured). For all practical purposes, $R_1$ through $R_{14}$ are equal and may be represented by the same resistance R.

Substituting equation (1) above into equation (2) and simplifying yields:

$$\frac{\Delta V_s}{V} = \frac{F_g}{8} (\epsilon_1 + \epsilon_3 + \epsilon_{11} + \epsilon_{13} - \epsilon_2 - \epsilon_4 - \epsilon_{12} - \epsilon_{14}) \tag{3}$$

which defines the relationship of the strains on the eight gages in the bridge to the output signal from the bridge provided that all of the eight gages in the bridge have the same gage factor.

Figure 10:
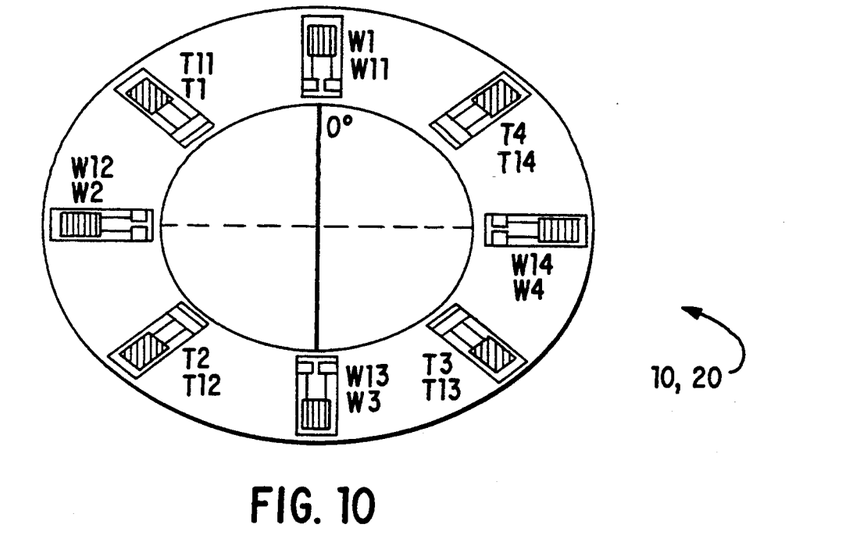
FIG. 10 is a view similar to FIG. 1 but showing an exaggerated distortion of the load cell in response to WOB.
Figure 11:
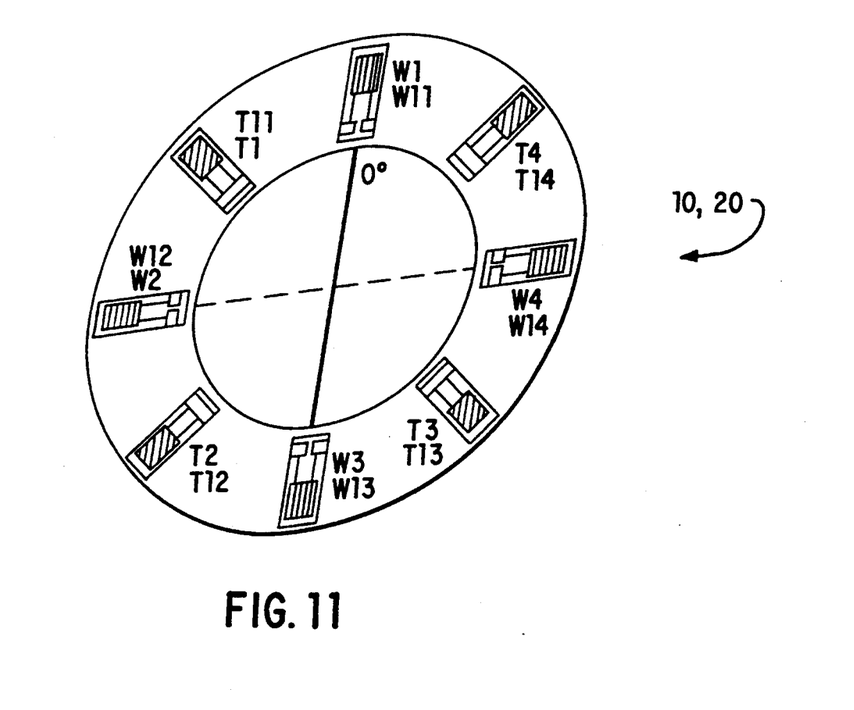
FIG. 11 is a view similar to FIG. 1 but showing an exaggerated distortion of the load cell in response to TOB.

Those skilled in the art will recognize that because of the arrangement and wiring of the gages, the strains in the stretched gages (the even numbered gages as shown in FIGS. 10 and 11) are subtracted from the strains in the compressed gages (the odd numbered gages as shown in FIGS. 10 and 11). It will be appreciated, therefore, that when the load cells are subjected to WOB only, the torque strain gages T1-T4 and T11-T14 are all subjected to the same stretching strain (FIG. 10) and cancel each other out producing no change in voltage at the output of bridge 60. Similarly, when the load cells are subjected to TOB only, the weight strain gages W1-W4 and W11-W14 are all subjected to the same stretching strain (FIG. 11) and cancel each other out producing no change in voltage at the output of bridge 50.

In actual drilling operations, the output of bridge 50 responds only to WOB and the output of bridge 60 responds only to TOB. This arrangement of strain gages and the load cells also eliminates erroneous measurements due to other forces such as hydrostatic pressure, temperature, bending, etc. In order for the bridges to produce a change in output, there must be opposite strains on odd and even strain gages. Since extraneous forces affect all the strain gages in the same way, the extraneous forces are cancelled out by the bridge circuits.

The above described embodiment of the invention provides accurate weight on bit measurements during normal continuous drilling operations where differential pressure does not fluctuate much. During such normal drilling operations, compensation for the effects of differential pressure on WOB measurements can be made by frequently rezeroing the sensor; i.e., by lifting the drill bit off the bottom of the borehole and resetting the WOB to zero. If, however, a downhole mud motor is used, the differential pressure can fluctuate by as much as several hundred pounds per square inch (psi). In order to compensate for the effects of sizable differential pressure fluctuations on WOB measurements, an alternate embodiment of the load cell of the invention is provided.

Figure 12:
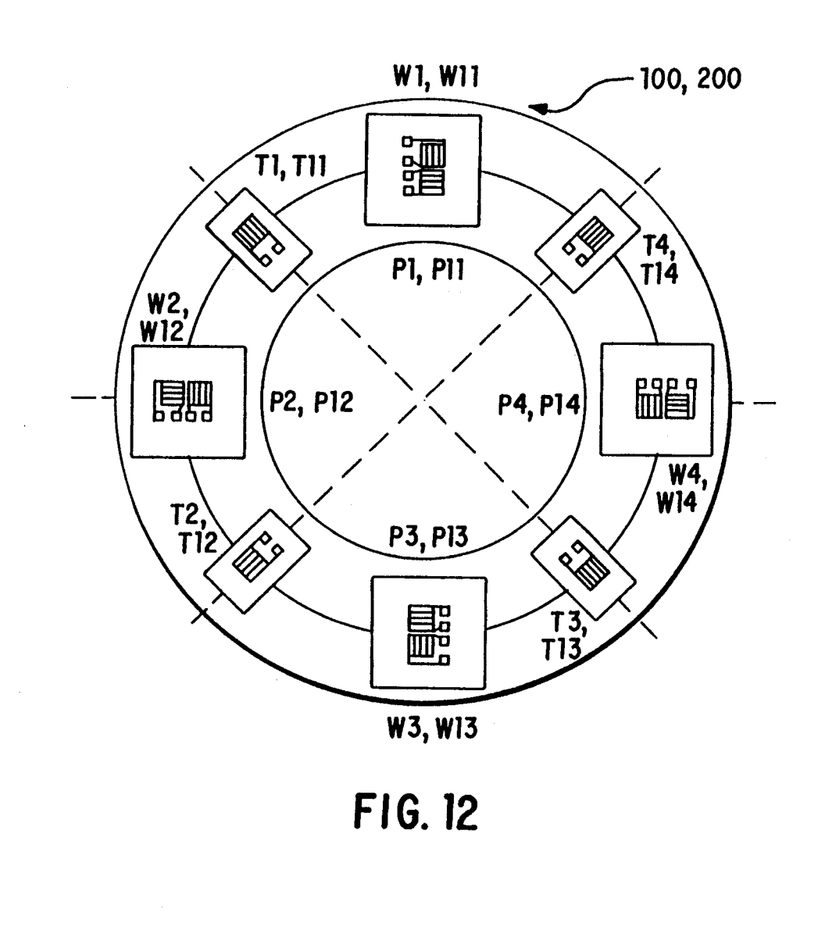
FIG. 12 is a view similar to FIG. 1 but showing an alternate embodiment of a load cell with pressure differential strain gages.
Figure 13:
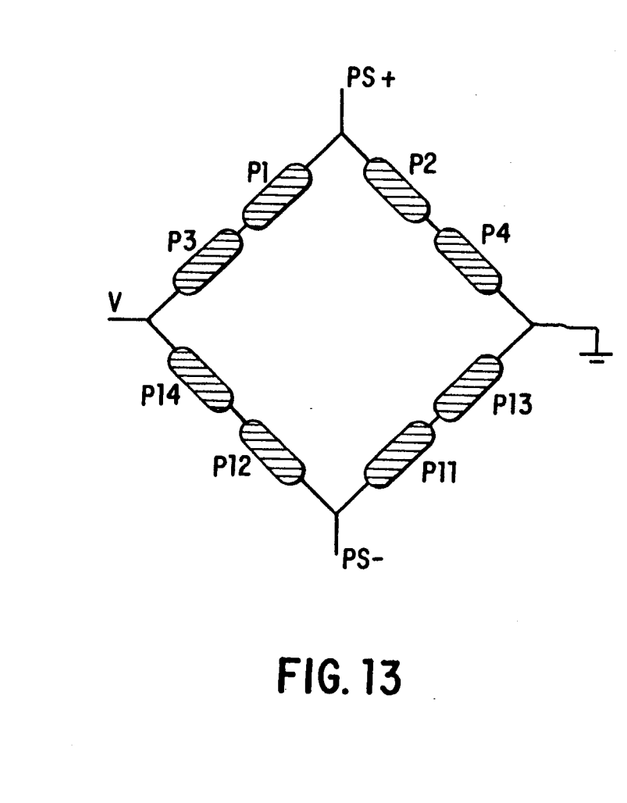
FIG. 13 is a view similar to FIGS. 8 and 9 showing the coupling of pressure differential strain gages to form a Wheatstone bridge for measuring pressure differential.

FIG. 12 shows the alternate embodiment of load cells 100, 200 which include pressure strain gages P1-P4 on load cell 100 and pressure strain gages P11-P14 on load cell 200. It will be noted that the pressure strain gages are mounted adjacent similarly numbered weight strain gages. For example, on load cell 100, pressure strain gage P1 is mounted adjacent weight strain gage W1, etc. On load cell 200, pressure strain gage P11 is mounted adjacent weight strain gage W11, etc. The pressure strain gages P1-P4 from load cell 100 are coupled with the pressure strain gages P11-P14 to form a Wheatstone bridge as shown schematically in FIG. 13. It will be appreciated that the coupling of the pressure strain gages is similar to the coupling of the WOB and TOB strain gages described above. Therefore, as shown in FIG. 13, the difference of outputs PS+ and PS− is proportional to differential pressure.

Those skilled in the art will appreciate that as the WOB strain gages are affected by differential pressure, the differential pressure strain gages are somewhat affected by WOB. Nevertheless, by combining the outputs from the pressure bridge with the weight bridge, the effects of differential pressure on WOB measurements can be cancelled. In combining these outputs, it is recognized that:

$$S1 = C1 \ W + C2 \Delta P \tag{4}$$

and $$S2 = C3 \ W + C4 \Delta P \tag{5}$$

where S1 is the output of the WOB bridge, S2 is the output of the pressure bridge, W is the true weight on bit, C1-C4 are gain constants, and $\Delta P$ is the differential pressure.

The combination of the outputs of the pressure and weight bridges is given by the following equation which provides a compensated signal S which is proportional to the weight on bit independent of the fluctuations in differential pressure:

$$S = S1 + g\, S2 \tag{6}$$

where g is chosen to be a constant ($-C2/C4$) related to relative impact of differential pressure in the signals S1 and S2. By substituting equations 4 and 5 into equation 6, the following relationship is obtained:

$$S = (C1 + g\, C3)\, W + (C2 + g\, C4)\, P \tag{7}$$

Because $g = -C2/C4$, equation 7 may be simplified to yield:

$$S = (C1 + g\, C3)\, W \tag{8}$$

Those skilled in the art will appreciate that minimal circuitry is needed to scale and combine the signals S1 and S2 as shown in equation 6 and that the resulting output will be proportional to the true weight on bit as indicated by equation 8. Those skilled in the art will also recognize that a similar combination of signals S1 and S2 can provide a corrected signal indicating differential pressure if such a signal is desired (by choosing g to be $-C1/C3$ and scaling S1 before adding to S2, etc.) It will also be appreciated that with the addition of the bridge of FIG. 13 which permits the differential pressure measurement to be made, an additional two terminals are required on each load cell. Thus, as mentioned above, the redundant terminals shown in FIGS. 6 and 7 can be made available for this purpose.

There have been described and illustrated herein preferred embodiments of load cells for measuring weight and torque on a drill bit while drilling a well bore and for eliminating the effects of differential pressure on weight on bit measurements in extreme circumstances. While particular embodiments of the invention have been described, it is not intended that the invention be limited thereto, as it is intended that the invention be as broad in scope as the art will allow and that the specification be read likewise. Thus, while particular materials have been disclosed for construction of the load cell, it will be appreciated that other materials could be utilized. Also, while certain electrical connections utilizing terminal strips and a wiring harness have been shown, it will be recognized that other types of connections could be used with similar results obtained so long as the bridge circuits are arranged as described. Moreover, while particular configurations have been disclosed in reference to transmission of signals via wires in a mandrel, it will be appreciated that other telemetry means could be used instead. Furthermore, while the load cells have been disclosed as having a zero degree reference line, it will be understood that different kinds of indicia can achieve the same or similar function as disclosed herein. Also, while particular arrangements of eight (or twelve) strain gages per load cell are described, it will be appreciated that different numbers (both greater and fewer) of strain gages could be utilized provided proper account is taken mathematically. What is critical is that the strain gages be mounted on a cylinder which is of preferably low residual stress, and which in turn is inserted into pockets in the drill collar wall. It will therefore be appreciated by those skilled in the art that yet other modifications could be made to the provided invention without deviating from its spirit and scope as so claimed.

We claim:

1. A load cell for sensing forces on a drill bit during the drilling of a well bore with a drill collar connected in a drill string above the bit, the drill collar having a radial pocket therein for receiving said load cell, said load cell comprising:
    a) a substantially solid cylinder having a diameter such that said cylinder fits snugly in a radial pocket in a drill collar;
    b) first, second, third, and fourth force sensors mounted on said solid cylinder at ninety degree intervals, said sensors each providing an electrical resistance which varies according to a magnitude of force applied, wherein
        said first and third sensors are electrically coupled to each other to form a first sensor pair, and said second and fourth sensors are electrically coupled to each other to form a second sensor pair, each of said first and second sensor pairs having an electrical resistance which is the sum of the electrical resistance of each said sensor in said pair and said sensor pairs being electrically coupled to each other such that the electrical resistance of said second sensor pair is subtracted from the electrical resistance of said first sensor pair to provide a first output for said load cell.

2. A load cell according to claim 1, wherein:
said cylinder is made of a high strength homogeneous material having low residual stress.

3. A load cell according to claim 1, wherein:
said cylinder includes an angular reference index for mounting said cylinder in the pocket such that said sensors are angularly located relative to a vertical axis of the drill collar.

4. A load cell according to claim 1, wherein:
said cylinder has a stepped diameter which defines a first annular surface and a hub with a second surface, and said sensors are mounted on said first annular surface.

5. A load cell according to claim 1, wherein:
said first, second, third, and fourth force sensors are strain gages.

6. A load cell according to claim 1, wherein:
said first sensor pair is mounted on said solid cylinder at a position such that when said load cell is received in the pocket of the drill collar, said first sensor pair is aligned with a vertical axis of the drill collar and said first output of said load cell is indicative of weight-on-bit.

7. A load cell according to claim 1, wherein:
said first sensor pair is mounted on said solid cylinder at a position such that when said load cell is received in the pocket of the drill collar, said first sensor pair is located in a line forty-five degrees from a vertical axis of the drill collar and said first output of said load cell is indicative of torque-on-bit.

8. A load cell according to claim 6, further comprising:
    c) fifth, sixth, seventh, and eighth force sensors mounted on said cylinder at ninety degree intervals and respectively offset forty-five degrees from said first, second, third, and fourth sensors, said fifth, sixth, seventh, and eighth sensors each providing an electrical resistance which varies according to a magnitude of force applied, wherein said fifth and seventh sensors are one hundred eighty degrees apart from each other and are electrically coupled to each other and form a third sensor pair, and said sixth and eighth sensors are one hundred eighty degrees apart from each other and are electrically coupled to each other and form a fourth sensor pair, each of said third and fourth sensor pairs having an electrical resistance which is the sum of the electrical resistance of each said sensor in said pair and said third and fourth sensor pairs being electrically coupled to each other such that the electrical resistance of said fourth sensor pair is subtracted from the electrical resistance of said third sensor pair to provide a second output for said load cell, said second output of said load cell being indicative of torque-on-bit.

9. A load cell according to claim 8, wherein:

said cylinder is made of a high strength homogeneous material having low residual stress and includes an angular reference index for mounting said cylinder in the pocket such that said sensors are angularly located relative to a vertical axis of the drill collar, and said first, second, third, fourth, fifth, sixth, seventh, and eighth force sensors are strain gages.

10. A load cell according to claim 9, wherein:

said cylinder has a stepped diameter which defines a first annular surface and a hub with a second surface, and said sensors are mounted on said first annular surface.

11. A load cell according to claim 1, wherein:

said first sensor pair is mounted on said solid cylinder at a position such that when said load cell is received in the pocket of the drill collar, said first sensor pair is aligned with a vertical axis of the drill collar and said first output of said load cell is indicative of differential pressure.

12. A load cell according to claim 6, further comprising:

c) fifth, sixth, seventh, and eighth force sensors mounted on said cylinder at ninety degree intervals and respectively adjacent to said first, second, third, and fourth sensors, said fifth, sixth, seventh, and eighth sensors each providing an electrical resistance which varies according to a magnitude of force applied, wherein said fifth and seventh sensors are electrically coupled to each other and form a third sensor pair, and said sixth and eighth sensors are electrically coupled to each other and form a fourth sensor pair, each of said third and fourth sensor pairs having an electrical resistance which is the sum of the electrical resistance of each said sensor in said pair and said third and fourth sensor pairs being electrically coupled to each other such that the electrical resistance of said fourth sensor pair is subtracted from the electrical resistance of said third sensor pair to provide a second output for said load cell, said second output of said load cell being indicative of differential pressure.

13. A load cell according to claim 8, further comprising:

d) ninth, tenth, eleventh, and twelfth force sensors mounted on said cylinder at ninety degree intervals and respectively adjacent to said first, second, third, and fourth sensors, said ninth, tenth, eleventh, and twelfth sensors each providing an electrical resistance which varies according to a magnitude of force applied, wherein said ninth and eleventh sensors are electrically coupled to each other and form a fifth sensor pair, and said tenth and twelfth sensors are electrically coupled to each other and form a sixth sensor pair, each of said fifth and sixth sensor pairs having an electrical resistance which is the sum of the electrical resistance of each said sensor in said pair and said fifth and sixth sensor pairs being electrically coupled to each other such that the electrical resistance of said sixth sensor pair is subtracted from the electrical resistance of said fifth sensor pair to provide a third output for said load cell, said third output of said load cell being indicative of differential pressure.

14. A load cell according to claim 13, wherein:

said third output is scaled and added to said first output to provide a fourth output being indicative of weight on bit which is corrected for fluctuations in differential pressure.

15. An apparatus for sensing forces on a drill bit during the drilling of a well bore, said apparatus comprising:

a) a drill collar having a vertical axis and including means for connecting to a drill string above the bit, said drill collar having a pair of diametrically opposite radial pockets;

b) a pair of load cells, each load cell including, i) a cylinder having a diameter such that said cylinder fits snugly in one of the radial pockets of the drill collar, ii) first, second, third, and fourth force sensors mounted on said cylinder at ninety degree intervals, said sensors each providing an electrical resistance which varies according to a magnitude of force applied, wherein for each load cell said first and third sensors are electrically coupled to each other to form a first sensor pair, and said second and fourth sensors are electrically coupled to each other to form a second sensor pair, each of said first and second sensor pairs having an electrical resistance which is the sum of said electrical resistance of each said sensor in said pair; and c) electrical coupling means for coupling said first and second sensor pairs from both of said load cells to a source of voltage and to a voltage measuring means.

16. An apparatus according to claim 15, wherein:

said electrical coupling means couples said first and second sensor pairs from both of said load cells in a bridge circuit having four arms, each of said arms comprising one of said sensor pairs, said first sensor pairs forming opposite arms of said bridge circuit.

17. An apparatus according to claim 15, wherein: each load cell further includes, iii) fifth, sixth, seventh, and eighth force sensors mounted on said cylinder at ninety degree intervals and respectively offset forty-five degrees from said first, second, third, and fourth sensors, said fifth, sixth, seventh, and eighth sensors each providing an electrical resistance which varies according to a magnitude of force applied, wherein said fifth and seventh sensors are one hundred eighty degrees apart from each other and are electrically coupled to each other and form a third sensor pair, and said sixth and eighth sensors are one hundred eighty degrees apart from each other and are electrically coupled to each other and form a fourth sensor pair, each of said third and fourth sensor pairs having an electrical resistance which is the sum of the electrical resistance of each said sensor in said pair, and said electrical coupling means further includes means for coupling said third and fourth sensor pairs from both of said load cells to the source of voltage and to a second voltage measuring means.

18. An apparatus according to claim 17, wherein:
said electrical coupling means couples said first and second sensor pairs from both of said load cells in a first bridge circuit having four arms, each of said arms comprising one of said sensor pairs, said first sensor pairs forming opposite arms of said first bridge circuit, and said electrical coupling means couples said third and fourth sensor pairs from both of said load cells in a second bridge circuit having four arms, each of said arms comprising one of said third and fourth sensor pairs, said third sensor pairs forming opposite arms of said second bridge circuit.

19. An apparatus according to claim 18, wherein:
said first bridge circuit produces an output voltage proportional to weight-on-bit and said second bridge circuit produces an output voltage proportional to torque-on-bit.

20. An apparatus according to claim 19, wherein:
said first sensor pair is aligned with the vertical axis of the drill collar and said third sensor pair is located in a line forty-five degrees from the vertical axis of the drill collar.

21. An apparatus according to claim 18, wherein:
said cylinders are made of a high strength homogeneous material having low residual stress.

22. An apparatus according to claim 18, wherein:
said cylinders each include an angular reference index for mounting said cylinder in the pocket such that said sensors are angularly located relative to the vertical axis of the drill collar.

23. An apparatus according to claim 18, wherein:
said cylinders each have a stepped diameter which defines first annular surfaces and hubs with second surfaces, and said sensors are mounted on said first annular surfaces.

24. An apparatus according to claim 15, further comprising:
c) a pair of sealing caps for covering the radial pockets in the drill collar.

25. An apparatus according to claim 15, wherein:
each load cell further includes,
iii) fifth, sixth, seventh, and eighth force sensors mounted on said cylinder at ninety degree intervals and respectively adjacent to said first, second, third, and fourth sensors, said fifth, sixth, seventh, and eighth sensors each providing an electrical resistance which varies according to a magnitude of force applied, wherein
said fifth and seventh sensors are electrically coupled to each other and form a third sensor pair, and said sixth and eighth sensors are electrically coupled to each other and form a fourth sensor pair, each of said third and fourth sensor pairs having an electrical resistance which is the sum of the electrical resistance of each said sensor in said pair, and said electrical coupling means further includes means for coupling said third and fourth sensor pairs from both of said load cells to the source of voltage and to a second voltage measuring means.

26. An apparatus according to claim 25, wherein:
said electrical coupling means couples said first and second sensor pairs from both of said load cells in a first bridge circuit having four arms, each of said arms comprising one of said sensor pairs, said first sensor pairs forming opposite arms of said first bridge circuit, and said electrical coupling means couples said third and fourth sensor pairs from both of said load cells in a second bridge circuit having four arms, each of said arms comprising one of said third and fourth sensor pairs, said third sensor pairs forming opposite arms of said second bridge circuit.

27. An apparatus according to claim 26, wherein:
said first bridge circuit produces an output voltage proportional to weight-on-bit and said second bridge circuit produces an output voltage proportional to differential pressure.

28. An apparatus according to claim 26, wherein:
said second bridge circuit output voltage is scaled and added to said first bridge circuit voltage to provide an output voltage proportional to weight on bit which is corrected for fluctuations in differential pressure.

29. An apparatus according to claim 17, wherein:
each load cell further includes,
iv) ninth, tenth, eleventh, and twelfth force sensors mounted on said cylinder respectively adjacent to said first, second, third, and fourth sensors, said ninth, tenth, eleventh, and twelfth sensors each providing an electrical resistance which varies according to a magnitude of force applied, wherein
said ninth and eleventh sensors are electrically coupled to each other and form a fifth sensor pair, and said tenth and twelfth sensors are electrically coupled to each other and form a sixth sensor pair, each of said fifth and sixth sensor pairs having an electrical resistance which is the sum of the electrical resistance of each said sensor in said pair, and said electrical coupling means further includes means for coupling said fifth and sixth sensor pairs from both of said load cells to the source of voltage and to a third voltage measuring means.

30. An apparatus according to claim 29, wherein:
said electrical coupling means couples said first and second sensor pairs from both of said load cells in a first bridge circuit having four arms, each of said arms comprising one of said sensor pairs, said first sensor pairs forming opposite arms of said first bridge circuit, said electrical coupling means couples said third and fourth sensor pairs from both of said load cells in a second bridge circuit having four arms, each of said arms comprising one of said third and fourth sensor pairs, said third sensor pairs forming opposite arms of said second bridge circuit, and said electrical coupling means couples said fifth and sixth sensor pairs from both of said load cells in a third bridge circuit having four arms, each of said arms comprising one of said fifth and sixth sensor pairs, said fifth sensor pairs forming opposite arms of said third bridge circuit.

31. An apparatus according to claim 30, wherein:
said first bridge circuit produces an output voltage proportional to weight-on-bit, said second bridge circuit produces an output voltage proportional to torque-on-bit, and said third bridge circuit produces an output voltage proportional to differential pressure.

32. An apparatus according to claim 31, wherein:
said first sensor pair and said fifth sensor pair are each aligned with the vertical axis of the drill collar and said third sensor pair is located in a line forty-five degrees from the vertical axis of the drill collar.

33. A load cell for sensing forces on a drill bit during the drilling of a well bore with a drill collar connected in a drill string above the bit, the drill collar having a radial pocket therein for receiving said load cell, said load cell comprising:
 a) a substantially solid cylinder of high strength homogenous material having low residual stress, said substantially solid cylinder having a diameter such that said cylinder fits snugly in a radial pocket in a drill collar; and
 b) at least four force sensors mounted on and spaced around said cylinder, each force sensor providing an electrical resistance which varies according to a magnitude of force applied thereto.

34. A load cell according to claim 33, wherein:
said cylinder has a stepped diameter which defines a first annular surface and a hub with a second surface, and said force sensors are mounted on said first annular surface, and
said at least four force sensors are strain gages.

35. A load cell according to claim 33, wherein:
said at least four force sensors comprise first, second, third, and fourth force sensors mounted around said solid cylinder at ninety degree intervals, wherein
said first and third sensors are electrically coupled to each other to form a first sensor pair, and said second and fourth sensors are electrically coupled to each other to form a second sensor pair, each of said first and second sensor pairs having an electrical resistance which is the sum of the electrical resistance of each said sensor in said pair and said sensor pairs being electrically coupled to each other such that the electrical resistance of said second sensor pair is subtracted from the electrical resistance of said first sensor pair to provide a first output for said load cell, and
said first sensor pair is aligned with the vertical axis of the drill collar and said first output of said load cell is indicative of weight-on-bit.

36. A load cell according to claim 33, wherein:
said at least four force sensors comprise first, second, third, and fourth force sensors mounted around said solid cylinder at ninety degree intervals, wherein
said first and third sensors are electrically coupled to each other to form a first sensor pair, and said second and fourth sensors are electrically coupled to each other to form a second sensor pair, each of said first and second sensor pairs having an electrical resistance which is the sum of the electrical resistance of each said sensor in said pair and said sensor pairs being electrically coupled to each other such that the electrical resistance of said second sensor pair is subtracted from the electrical resistance of said first sensor pair to provide a first output for said load cell, and
said first sensor pair is located in a line forty-five degrees from the vertical axis of the drill collar and said first output of said load cell is indicative of torque-on-bit.

* * * * *